March 22, 1938. D. D. KNOWLES 2,112,031

EXCITATION SYSTEM FOR VAPOR ELECTRIC CONVERTERS

Filed March 5, 1936

WITNESSES:
C. J. Weller.
S. A. Stuckfelt.

INVENTOR
Dewey D. Knowles.
BY O. B. Buchanan
ATTORNEY

Patented Mar. 22, 1938

2,112,031

UNITED STATES PATENT OFFICE 2,112,031

EXCITATION SYSTEM FOR VAPOR ELECTRIC CONVERTERS

Dewey D. Knowles, Wilkinsburg, Pa., assignor to Westinghouse Electric & Manufacturing Company, East Pittsburgh, Pa., a corporation of Pennsylvania Application March 5, 1936, Serial No. 67,292

10 Claims. (Cl. 175—363)

My invention relates to an excitation system for a vapor-electric converter, and particularly to a make-alive system for an inverted rectifier.

This application is a continuation as to common subject matter of application Serial No. 690,702, filed September 23, 1933.

In the operation of vapor-electric converters of the type employing make-alive electrodes, that is, electrodes which initiate a cathode spot at the beginning of each conducting period, considerable disadvantage has been found in that the make-alive electrodes carry considerable excited current. This current is not only detrimental to the make-alive material but is disadvantageous in that it increases the losses of the converter.

It is an object of my invention to provide a make-alive circuit in which the current will be furnished to the make-alive electrodes only during the brief interval necessary to create a cathode spot.

It is a further object of my invention to provide an excitation system which will automatically govern the frequency output of the converter.

I achieve this advantage by providing a capacitor in series with a plurality of make-alive electrodes and governing the discharge of the capacitor by means of suitable discharge devices, such as glow-tubes or even controlled arc gaps. The timing feature of my invention comprises a timing resistor to control the time necessary to supply sufficient potential to the make-alive capacitor to break down the glow-tubes and, consequently, form the cathode spot.

It is a further object of my invention to provide a method of initiating the discharge in a vapor-electric device acting as an inverted rectifier when the rectifier is supplying a load, the frequency of which is not established by outside means.

Other objects and advantages of my invention will be apparent from the following specification, taken in conjunction with the accompanying drawing, in which.

Figure 1:
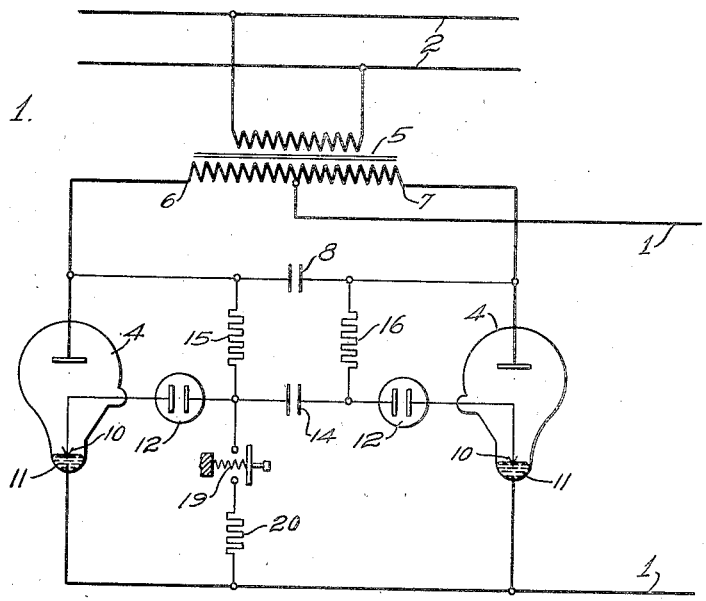
Figure 1 is a schematic illustration of a converter embodying my invention.

The apparatus according to my invention comprises a suitable direct-current system 1 and an alternating-current system 2 connected by means of a converter having a plurality of discharge chambers 4 fed by a suitable transformer 5. Preferably, the terminals 6—7 of the transformer 5 are provided with a suitable capacitor 8 for interrupting current flow from either terminal at the end of the desired conducting interval. However, as is well known, the commutating capacitor 8 can be dispensed with when the output frequency of the converter is established by some other means, such as synchronous devices supplied by the converter or when the frequency is established by an independent source in parallel with the converter.

Each of the arc chambers 4 is provided with an electrode 10 composed of suitable resistance material such as carborundum, boron, boron carbide, etc., in contact with the vaporizing cathode material 11. These make-alive electrodes 10 are connected through suitable discharge means 12, such as glow tubes or even simple arc chambers, to the opposite sides of a make-alive capacitor 14. The opposite sides of the make-alive capacitor 14 are connected to the anode terminals 6—7 of the transformer 5 by means of suitable timing resistors 15—16. The frequency of the alternating-current output may be determined by varying the resistance 15—16 in the charging circuit of the make-alive capacitor 14. For purposes of simplicity of illustration, the timing resistors 15—16 and the commutating capacitor 8 have been shown as having a common connection to the anode terminals 6—7, but obviously the commutating capacitor 8 could have a separate connection or in certain applications be omitted altogether.

The resistors 15—16 are of such value that when the direct current is applied across the terminals of the converter, the current flow is not sufficient to operate the make-alive electrodes 10.

In order to initiate operation of the converter when the alternating-current system 2 is deenergized, I provide a suitable device, such as a switch 19, and a current limiting resistor 20, for momentarily short circuiting one of the series discharge devices 12.

To start operation of my device, power is applied to the direct-current line 1 in such manner that the positive potential is applied through the transformer 5 to the anodes of the arc chambers 4, while negative potential is applied to the cathodes 11.

If the alternating-current line 2 is energized, the capacitor 14 will be charged and operation will follow at once.

Assuming that the alternating-current line 2 is deenergized, the positive potential will be applied to both terminals 6 and 7 with the result that the capacitor 14 will not receive a charge and the line voltage is thus applied across tubes 12 in series with the make-alive electrode 10 and the timing resistance 15—16. The resistance of the resistors 15—16 is sufficiently high that the current through tube 12 is of such a low value that the current in the make-alive electrodes 10 is not sufficient to create a cathode spot and the device remains inactive. Now, by closing the key 19 connecting the one side of the capacitor 14 to the negative side of line 1, the condenser 14 is allowed to charge to substantially line voltage. The charged capacitor 14 will then discharge through the right-hand tube 12 and initiate a cathode spot in tube 4, at which time key 19 should be opened to permit charging of capacitor 14 in the opposite direction.

The device then will operate at a frequency dependent upon the resistance of resistors 15—16. Obviously, the frequency may be varied by changing the value of resistance of resistors 15—16.

Figure 2:
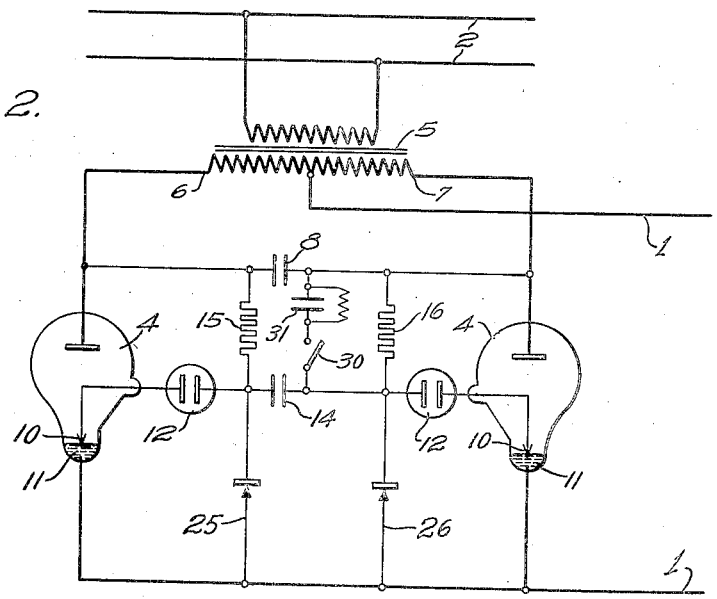
Fig. 2 is a similar illustration of a modification according to my invention.

In the modification according to Fig. 2, suitable unidirectional conductors 25—26 are inserted between the negative side of line 1 and the opposite sides of the capacitor 14, in order to provide a low impedance return path for the make-alive current. This materially reduces the energy consumption of the make-alive system and also reduces the danger of arc-back in the inactive valve 4. While key 19, arranged as shown in Fig. 1, may be utilized to initiate operation, I prefer to provide a key 30 around one of the timing resistors, such as 16, to apply the line potential directly to one of the control tubes 12. Suitable means, such as a capacitor 31, should be provided for limiting the duration of current flow through the starting circuit. The key 30 should be opened as soon as the make-alive current has been terminated by the capacitor 31, in order to prevent interference with the timing of the make-alive system by the resistors 15—16.

By changing the resistance 15 of the timing circuit supplying potential to the make-alive capacitor 14, the frequency of the alternating-current may be satisfactorily governed.

While I have shown and described for purposes of illustration specific embodiments of my invention, it will be apparent to those skilled in the art that changes and modifications can be made therein without departing from the true spirit of my invention or the scope of the appended claims.

I claim as my invention:

1. A vapor-electric converter particularly for converting direct current to alternating current comprising a plurality of arc-chambers, a pair of main electrodes in each arc chamber, a transformer for feeding current to the converter, a commutating capacitor associated with said transformer, a make-alive electrode in each arc chamber, an excitation condenser for supplying current to said make-alive electrodes, an arc discharge device in series with each of said make-alive electrodes and resistance means for charging the excitation condenser from the transformers.

2. A vapor-electric converter particularly for converting direct current to alternating current comprising a plurality of arc-chambers, a pair of main electrodes in each arc chamber, a transformer for feeding current to the converter, a commutating capacitor associated with said transformer, a make-alive electrode in each arc chamber, an excitation condenser for supplying current to said make-alive electrodes, an arc discharge device in series with each of said make-alive electrodes and resistance means for charging the excitation condenser from the transformer, and a circuit for initially charging the condenser.

3. An ignition system for a vapor-electric converter comprising a plurality of arc chambers, means for controlling current flow to said arc chambers, an ignition electrode in each of said chambers, a condenser for each pair of arc chambers, the ignition electrodes in said pair of arc chambers being connected to opposite sides of said condenser, an auxiliary discharge device in series between each of said electrodes and said condenser and means for alternately charging the condenser in reverse direction.

4. An ignition system for a vapor-electric converter comprising a plurality of arc chambers, means for commutating current between said arc chambers, an ignition electrode in each of said chambers, a condenser for each pair of arc chambers, the ignition electrodes in said pair of arc chambers being connected to opposite sides of said condenser, an auxiliary discharge device in series between each of said electrodes and said condenser, an inductive winding for supplying current to said converter and timing resistances connected between opposite sides of said condenser and the respective ends of said winding.

5. A conversion system comprising a vapor-electric converter having a plurality of discharge chambers, an anode and a cathode in each chamber, means for commutating current between said chambers, an auxiliary electrode in each chamber, said auxiliary electrode being adapted for initiating a cathode spot on said cathode, a supply system for the auxiliary electrodes comprising a capacitor, said auxiliary electrodes being connected to opposite sides of said capacitor, timing resistances connected to the opposite sides of said capacitor and the anodes of the respective discharge chambers, and arc discharge devices connected between the capacitor and the auxiliary electrodes for applying the potential of the capacitor to the auxiliary electrodes.

6. A vapor-electric conversion system comprising an alternating and a direct-current line, a vapor-electric converter having a plurality of discharge chambers, a pair of main electrodes in each of said chambers, an inductive winding for supplying current to said main electrodes, means for controlling current flow from said winding to said discharge chambers, an auxiliary electrode associated with one of the main electrodes in each chamber for initiating a cathode spot therein, a capacitor for supplying current to said auxiliary electrodes, connections from the inductive winding to said capacitor for supplying potential thereto, timing means in said connections, said capacitor being connected to each of said auxiliary electrodes and discharge means between said capacitor and said electrode for controlling the passage of current to said electrodes.

7. A vapor-electric conversion system comprising an alternating and a direct-current line, a vapor-electric converter having a plurality of discharge chambers, a pair of main electrodes in each of said chambers, an inductive winding for supplying current to said main electrodes, condenser means for controlling current flow from said winding to said discharge chambers, an auxiliary electrode associated with one of the main electrodes in each chamber for initiating a cathode spot therein, a capacitor for supplying current to said auxiliary electrodes, connections from the inductive winding to said capacitor for supplying potential thereto, said capacitor being connected to each of said auxiliary electrodes and discharge means between said capacitor and said electrode for controlling the passage of current to said electrodes and resistances in the connections between the winding and the capacitor for timing the charge thereon.

8. An ignition system for a vapor-electric converter having a plurality of arc chambers and means for distributing current to said chambers comprising an auxiliary electrode in each of the arc chambers, a capacitor for supplying current to said electrodes, a connection for supplying charging current to said capacitor, voltage responsive discharge means for applying the capacitor potential to said electrodes, and a connection for securing an initial charge on said capacitor.

9. An ignition system for a vapor-electric converter having a plurality of arc chambers and means for distributing current to said chambers comprising an auxiliary electrode in each of the arc chambers, a capacitor for supplying current to said electrodes, a connection for supplying charging current to said capacitor, voltage responsive discharge means for applying the capacitor potential to said electrodes, and a connection for providing initial current flow to one of said auxiliary electrodes.

10. A conversion system comprising a vapor-electric converter having a plurality of discharge chambers, an anode and a cathode in each chamber, means for controlling current flow to said chambers, an auxiliary electrode in each chamber, said auxiliary electrode being adapted for initiating a cathode spot on said cathode, a supply system for the auxiliary electrode comprising a capacitor, said auxiliary electrodes being connected to opposite sides of said capacitor, timing resistances connected to said capacitor and to the anodes of the discharge chambers for supplying potential thereto, arc discharge devices for applying the potential of the capacitor to the auxiliary electrodes, and a low impedance return circuit for said capacitor.

DEWEY D. KNOWLES.